E. A. TROMMALD & A. VON BOECKLIN.
MANIFOLD ORDER HOLDER.
APPLICATION FILED MAY 29, 1908.

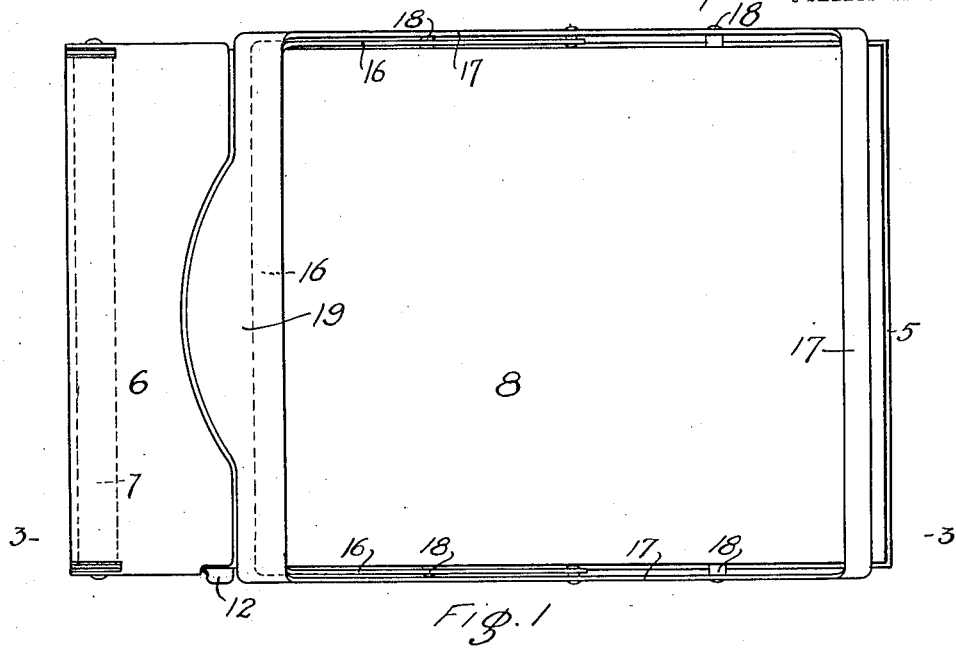
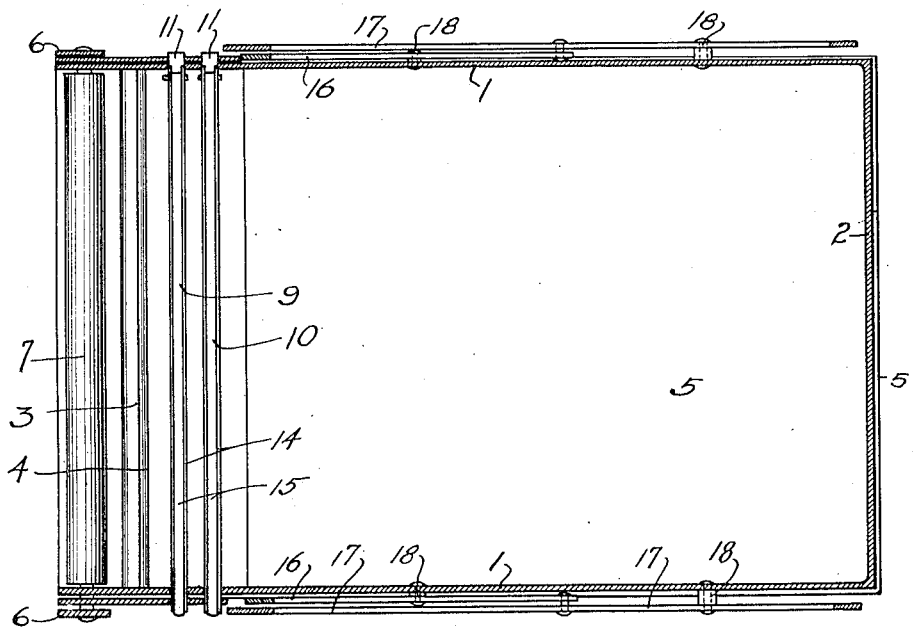

910,099.

Patented Jan. 19, 1909.

3 SHEETS—SHEET 2.

WITNESSES
J. T. Craig
D. A. Outoall

INVENTORS
Edward A. Trommald
August von Boecklin
by
R. S. Elliott
ATTORNEY

E. A. TROMMALD & A. VON BOECKLIN.
MANIFOLD ORDER HOLDER.
APPLICATION FILED MAY 29, 1908.
910,099.
Patented Jan. 19, 1909.
3 SHEETS—SHEET 3.
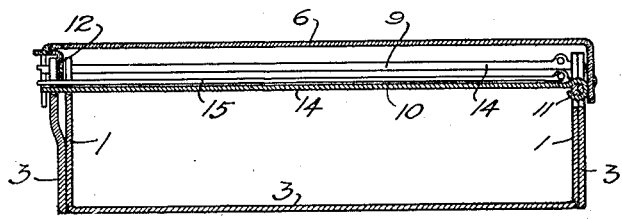
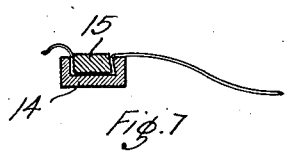
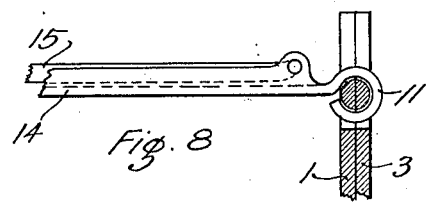
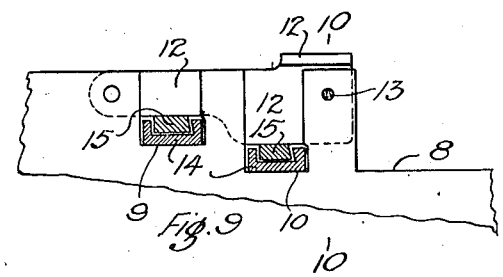
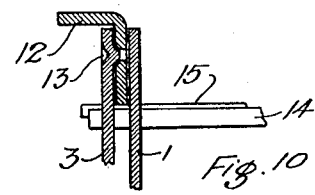
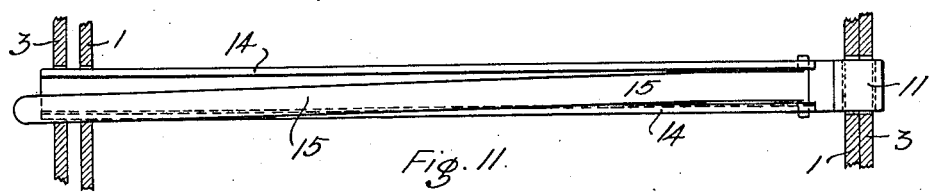
WITNESSES.
JT Craig
D. A. Outcalt
INVENTORS
Edward A. Trommald
August von Boecklin
by
M. I. Elliott
ATTORNEY

UNITED STATES PATENT OFFICE.

EDWARD A. TROMMALD AND AUGUST VON BOECKLIN, OF TACOMA, WASHINGTON.

MANIFOLD-ORDER HOLDER.

No. 910,099.　　　　Specification of Letters Patent.　　　Patented Jan. 19, 1909.

Application filed May 29, 1908. Serial No. 435,795.

*To all whom it may concern:*

Be it known that we, EDWARD A. TROMMALD and AUGUST VON BOECKLIN, citizens of the United States of America, residing at Tacoma, in the county of Pierce and State of Washington, have invented certain new and useful Improvements in Manifold-Order Holders, of which the following is a specification, reference being had therein to the accompanying drawing.

This invention relates to triplex manifolding devices and especially to such devices as are adapted for use in industrial establishments wherein it is desired to have triplicate copies of the orders or other papers used therein.

The objects of our invention are to improve the construction of such devices whereby they may be cheaply made and easily operated.

Our invention is illustrated in the accompanying drawings, in which—

Figure 3:
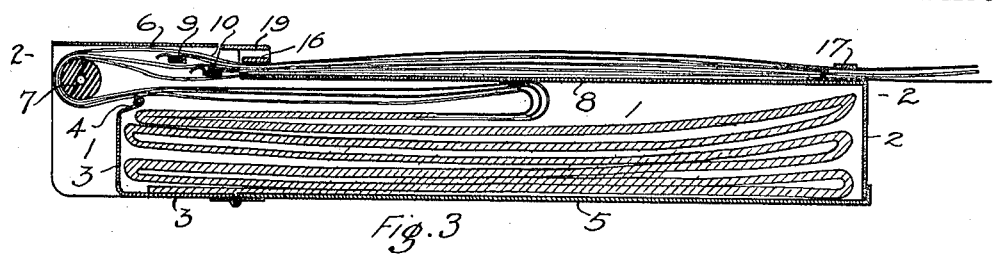
Figure 4:
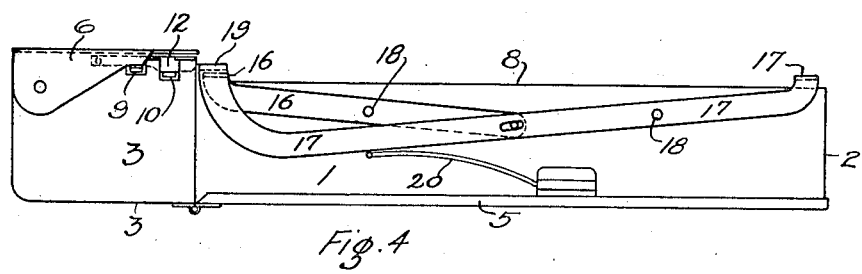
Figure 5:
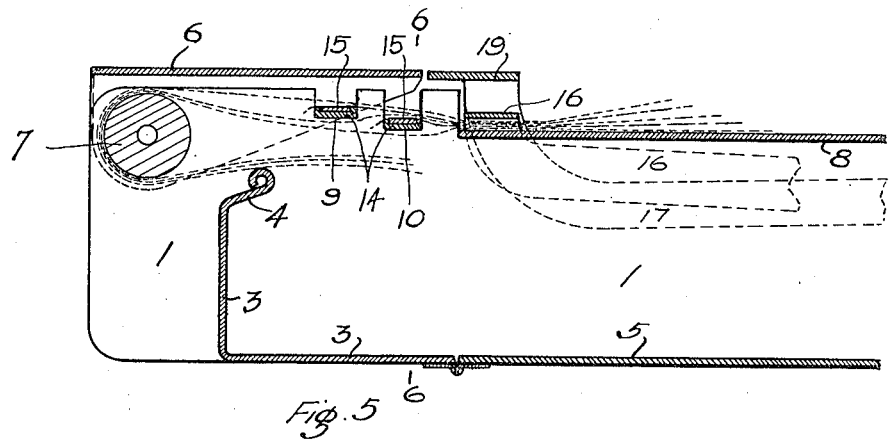

Figure 1 is a plan of our improved holder; Fig. 2 is a horizontal section thereof on the line 2—2 in Fig. 3; Fig. 3 is a vertical section thereof on the line 3—3 in Fig. 1; Fig. 4 is a side elevation thereof; Fig. 5 is a section similar to Fig. 3, drawn on a larger scale to show the positions of the various sheets of paper and of carbon paper; Fig. 6 is a cross section on the line 6—6 in Fig. 5; Fig. 7 is a cross section of the carbon paper holder; Fig. 8 is an enlarged elevation of a portion thereof; Fig. 9 is a side elevation of a part of the device showing the means for locking the carbon holders in position; Fig. 10 is a cross section on the line 10—10 in Fig. 9; and Fig. 11 is a plan showing the carbon holder in its released or free position.

Similar numerals of reference refer to similar parts throughout the several views.

This invention is incorporated in a box having a lid at the bottom and an opening at one end of the top side, said opening being suitably covered by a hinged lid. The box consists of two side pieces 1 joined together by the front plate 2 and a rear plate 3 which is fastened to the side pieces 1 and which is bent to form a portion of the bottom of the box, and which also has an inwardly bent upper part 4 adapted to hold the folds of paper within the box to prevent their being drawn out with the upper fold. A lower lid 5 is hinged to the bottom part of the piece 3 and forms a means whereby the paper is inserted into the box. An upper lid 6 is hinged to the two sides 1 and extends over the rear part of the box. Sufficient space is left between the top part of the holder 4 and the lid 6 for the paper to pass out of the box around the roller 7 and back over the top 8 of the box. The back plate 3 is set forward of the ends of the sides 1, and the roller 7 is mounted between the sides and to the rear of said plate 3. The sides 1 and the part of the plate 3, which is secured thereto and which extends up the full width of the sides, are notched to receive the two carbon holders 9 and 10. These carbon holders are substantially similar in construction and are each pivotally secured to one side of the box by a loop 11 (Fig. 8) which passes through a hole made in the side pieces 1 and 3, and the other ends of the carbon holders are held down by means of a bar 12 pivoted between the plates 1 and 3 on the other side of the box, as shown in Figs. 9 and 10, said bar 12 being held in this position by the spring action of a depression 13 formed in the side 3 and engaging in a hole in the bar 12.

Each carbon holder consists of shallow channel bar 14 having one edge thereof slightly beveled or under-cut, and a holder bar 15 pivoted to the channel bar 14, and adapted to lie within the channel, and having one edge slightly beveled to correspond with the beveled edge of the channel. As shown in Fig. 11, the bar 15 when loose from the bar 14 is slightly out of line therewith, so that when it is put into its holding position the strain will force the two beveled edges into contact and will keep the bar 15 in its position, the object of this being that when the locking bar 12 has been raised in order to renew the carbons, or for any other purpose, it is desirable that the bar 15 shall not at once release the carbon, and so that when carbons are being replaced, when the lower carbon has been put in place and the bar 15 thereof pressed into its holding position it will retain this position while the upper carbon is being fastened; the bar 12, however, locks both the carbon holders when it is in the position shown in Figs. 9 and 10. Again referring to Fig. 9, it will be seen that the channels 14 of the carbon holders engage under a small notch in the sides of the slots in the pieces 1 and 3. This has similar objects to that just described, in that the bar 14 of the lower holder is held in place while its bar 15 is being pressed into position, and also while the carbon is being fastened to the upper holder.

The sheets as they lie on the top 8 of the box are held down by means of two cross-bars 16 and 17, respectively, which are pivoted at 18 to the sides 1 of the box. The bar 17 extends from across the front end of the box to a point near the forward end of the lid 6 and then the part 19 thereof passes over the box immediately adjacent to said lid 6, as shown clearly in Fig. 1. The bar 16 passes from the rear end of the sheet under the part 19 and engages the bar 17 so that it is operated thereby. A spring 20 acts on the bar 17 and keeps both the bars 16 and 17 pressed downward on the paper and the part 19 raised. By depressing the part 19 the bars 16 and 17 are raised and the paper thereunder is loosened so that it may be easily drawn forward to expose an unused portion thereof. The raising of the bar 17 also allows the operator to gain a firm hold on the paper, especially as the bar is placed a short distance back from the front or cutting edge of the box. The sheets may be perforated at intervals to facilitate their being torn, and in this case the torn edge may extend out over a portion of the end of the box, since the box will not act as a cutter.

Having described our invention what we claim is:

1. In a manifold order holder, the combination of a receptacle having an opening at the rear upper end thereof; a forwardly bent part 4, within the receptacle and below the opening; a roller mounted to the rear of said opening; a plurality of carbon holders mounted across the opening and being at different levels and in different longitudinal positions so that a sheet of paper may be passed under all of said holders, and another sheet passed between said holders, and another sheet passed over said holders; a pivoted lid for said opening; a flat top to the receptacle adapted to form a writing surface whereon the paper lies; and a pair of clamp bars engaging the paper at each end of said flat top to hold it thereon.

2. In a carbon paper holder the combination of a channel bar having one edge of the channel undercut, and a holder bar pivoted to said channel bar and out of line therewith and having one edge beveled to correspond with the undercut side of the channel, whereby when said holder bar is placed in the channel the strain thereof will force it into close contact with said undercut side to retain it in said position.

3. In a triplicate order holder, the combination of a receptacle containing three continuous sheets of paper folded together with reversed folds, said folds being held in place by a forwardly bent part 4 at the rear end of said receptacle, and having an opening above said part 4; a roller mounted to the rear of said part 4; a carbon holder mounted across the opening and adapted to hold a carbon sheet above one of said sheets of paper which passes from the roller below the said carbon holder; a second carbon holder mounted parallel with said first carbon holder but with space therebetween wherein the middle sheet of paper passes from the roller and above said first carbon sheet, and adapted to hold a carbon sheet above said middle sheet; and a hinged cover above said second carbon holder with space therebetween wherein the upper sheet of paper passes from the roller and above the second carbon sheet.

In testimony whereof we affix our signatures in presence of two witnesses.

EDWARD A. TROMMALD.
AUGUST VON BOECKLIN.

Witnesses:
GEO. B. BURKE,
JOHN KUFFALEN.